United States Patent
Lautenbach-Lampe et al.

(10) Patent No.: US 6,269,478 B1
(45) Date of Patent: Jul. 31, 2001

(54) MONITORING METHOD FOR RECOGNIZING ENDLESS LOOPS AND BLOCKED PROCESSES IN A COMPUTER SYSTEM USING TASK STATE COMPARISONS

(75) Inventors: Dagmar Lautenbach-Lampe, Munich; Johannes Wollenweber, Penzberg; Mark Clark, Munich, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/120,792

(22) Filed: Jul. 22, 1998

(30) Foreign Application Priority Data

Jul. 22, 1997 (EP) .................................. 97112555

(51) Int. Cl.$^7$ .................................................. G05B 13/02
(52) U.S. Cl. ................................. 717/4; 714/15; 714/47; 714/51
(58) Field of Search .................................. 714/55, 2, 47, 714/51, 15; 717/4

(56) References Cited

U.S. PATENT DOCUMENTS

| | | | |
|---|---|---|---|
| 4,933,843 | * 6/1990 | Scheller et al. | 604/22 |
| 5,073,853 | * 12/1991 | Johnson | 714/23 |
| 5,278,976 | 1/1994 | Wu | 714/55 |
| 5,475,732 | * 12/1995 | Petsre, III | 379/34 |
| 5,649,098 | * 7/1997 | Shieh et al. | 714/55 |
| 5,907,674 | * 5/1999 | Koeninger et al. | 714/57 |
| 6,047,220 | * 4/2000 | Eryurek | 700/28 |
| 6,047,384 | * 4/2000 | Puhl et al. | 714/2 |
| 6,058,334 | * 5/2000 | Shapiro | 700/97 |

FOREIGN PATENT DOCUMENTS 0030233738 10/1991 (JP) .
0090062520 8/1995 (JP) .

OTHER PUBLICATIONS

Miller (Improved reliability for digital switching) Telephone Engineer & Management; pp. 1–3, Dec. 1986.*

* cited by examiner

Primary Examiner—Kakali Chaki
Assistant Examiner—Gautam R. Patel
(74) Attorney, Agent, or Firm—Schiff Hardin & Waite

(57) ABSTRACT

The specified monitoring program enables the recognition of endless loops or blocked processes in a computer system, in particular in a telecommunication switching system. When such software errors are recognized, error indices can be collected and stored, which enable a later error analysis and removal. The endless loops or, respectively, blocked processes can also be reset in a suitable way, so that no negative effects on other processes result.

20 Claims, 7 Drawing Sheets

MONITORING METHOD FOR RECOGNIZING ENDLESS LOOPS AND BLOCKED PROCESSES IN A COMPUTER SYSTEM USING TASK STATE COMPARISONS

BACKGROUND OF THE INVENTION

The present invention is directed to a monitoring method for recognizing software errors with which endless loops and/or blocked processes can be detected in a computer system and removed if necessary. In particular, detection of software errors in telecommunication switching systems is to be enabled.

Many software errors are recognized by the application software or by the hardware itself, e.g. due to plausibilization at interfaces, division by zero, memory access violation, etc. However, there are also software errors that do not fall into these categories of error, and thus regularly remain unrecognized. Such errors can have considerable consequences in the system, and can even lead to complete system blockages. However, in the earlier handling of such errors these negative effects can be avoided, or at least minimized.

SUMMARY OF THE INVENTION

It is an object of the present invention to provide a monitoring method with which software errors recognized neither by the respective application nor by the hardware can reliably be recognized.

With the inventive monitoring method, in particular endless software loops, and, if necessary, also blocked user processes, can be detected effectively and early, so that suitable countermeasures can be taken.

In general, for each deselection of a process an operating system scheduler (program) determines the runtime thereof, and compares this with a runtime limit value that is predetermined specifically for this process. If the runtime is higher than the predetermined runtime boundary value, a corresponding message is sent to the monitoring method. In a preferred construction, the monitoring method checks whether an earlier message relating to this process is already present, i.e., whether the process has already at some point exceeded the runtime limit. The first error message is thus not signaled through immediately as an endless loop; rather, at first only the possibility of an error is inferred.

A verification of the error preferably takes place with the aid of task counters, whereby the scheduler for each process maintains a specific counter that indicates whether a new task is being executed by the process. At the beginning of each new task, i.e., after a time delay has taken place, this task counter is increased. If a process is signaled for the first time, the inventive monitoring method calls this counter value, which stands for the corresponding process in the task counter, and stores it in a process control block (PCB), preferably in a field used only by the monitoring method. By means of comparison of the count state stored in the first message with the current count state of the task counter, the monitoring method can verify the error. That is, if it is determined that the process is still working on the same task, the error is considered verified, and an endless loop is inferred. Indices are then collected for the unambiguous identification of the error, and a corresponding corrective measure is introduced. In all other cases, the items of information required for the later verification of an error are stored in the process control block of the signaled process. This yields the advantage that an expensive data management within the monitoring process itself is avoided, since all data required for the monitoring are stored in the process control block of the respective process. These data are also supplied given a respective call of the monitoring method by the scheduler, so that no operating system calls are required in order to achieve what are known as snapshots.

Preferably, the monitoring program is also periodically cued by a higher-priority hardware timer, so that all programs running at a lower interrupt level are monitored. Dependent on the function to be monitored (user programs at interrupt level 0, startup software (recovery software), protocol handlers, or other supervisor software with an interrupt level greater than or equal to 1), different monitoring times can hereby be set. If the set monitoring time has expired without processes being executed during this time, additional indices are preferably collected for the verification and recognition of the error, and a corrective measure is then cued. Such indices can also already be collected during a monitoring session in progress, in order to enable an unambiguous location of a possible error. Preferably, given detection of an endless loop a single-step monitoring and registering first takes place for a determined time period for the program running in the endless loop, so that informative data are obtained for later error removal.

Preferably, a monitoring is also provided relating to blocked user processes ("stuck" monitoring). In this monitoring, all processes are scanned and monitored to check whether they are still processing messages. Process identifiers (PIDs) for each process are hereby stored in an internal table. This monitoring can for example be triggered periodically, every five seconds, by a low-priority process. According to the invention, a process is regarded as blocked if it is postponed and if one of its buffers contains a message that it does not read out within a given time period. This holds in particular when the buffer concerned can be read out only by this one particular process. In the case of a buffer to which several processes have access (threaded buffer), it is checked whether all processes that access this specific buffer are postponed, and are no longer processing messages still contained in the buffer. Here as well, given recognition of a blockade [or: deadlock], indices are collected for the clearer identification of the error, and corresponding corrective measures are then introduced. All data required for the monitoring are hereby stored in the process control block of the respective process, so that an expensive data management within the inventive monitoring method itself is avoided.

In the following, the invention is explained in more detail on the basis of exemplary embodiments, and with reference to the drawings.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

The exemplary embodiment described below relates to the use of the inventive monitoring method in a telecommunication switching system. Here, the software that carries out the call processing functions is designated application software (application), while the software that operates in user mode, i.e., normally at interrupt level 0 (process level), is designated user software. The software that runs in interrupt levels greater than or equal to 1 is designated supervisor software.

In the specified exemplary embodiment, the monitoring functions of the inventive monitoring method are called by the following measures.

The inventive monitoring function is periodically activated by a hardware timer in a higher interrupt level, e.g. interrupt level 8. By means of this periodic activation, a detection of endless loops is also achieved in supervisor mode, whereby all interrupt levels beneath the interrupt level activated by the hardware timer are monitored. The programming of the hardware timer with respect to the monitoring time period to be set preferably takes place during the initialization phase of the inventive monitoring method, which is carried out at a higher startup level (recovery).

The inventive monitoring method is also cued by a scheduler program, formed by the operating system (OS) that informs the monitoring method concerning processes that exceed a predetermined time limit in the execution of a task.

The calling of the inventive monitoring program can also be activated by the operating system time management function for the monitoring of blocked processes. After the first calling of this function, e.g. after startup, this monitoring process can be activated periodically by the time management function.

In order to enable a user-selective determination of the scope of the monitoring, identifiers are preferably provided for the individual process monitoring segments of the inventive monitoring program, which identifiers can be set or reset, and which indicate via their value whether the allocated process segment is respectively to be monitored or excluded from the scope of the monitoring. This enables a simple adaptation of the scope of the monitoring, and also makes it possible to neutralize errors that may be present in the monitoring function by means of intentional deactivation of the corresponding functional blocks.

In general, the exemplary embodiment of the inventive monitoring method is designed in such a way that a corrective intervention does not take place immediately when a time limit provided for a process is exceeded for the first time by this process. In this case, it is at first assumed only that there is the possibility of an error, e.g. of an endless loop.

Figure 1:
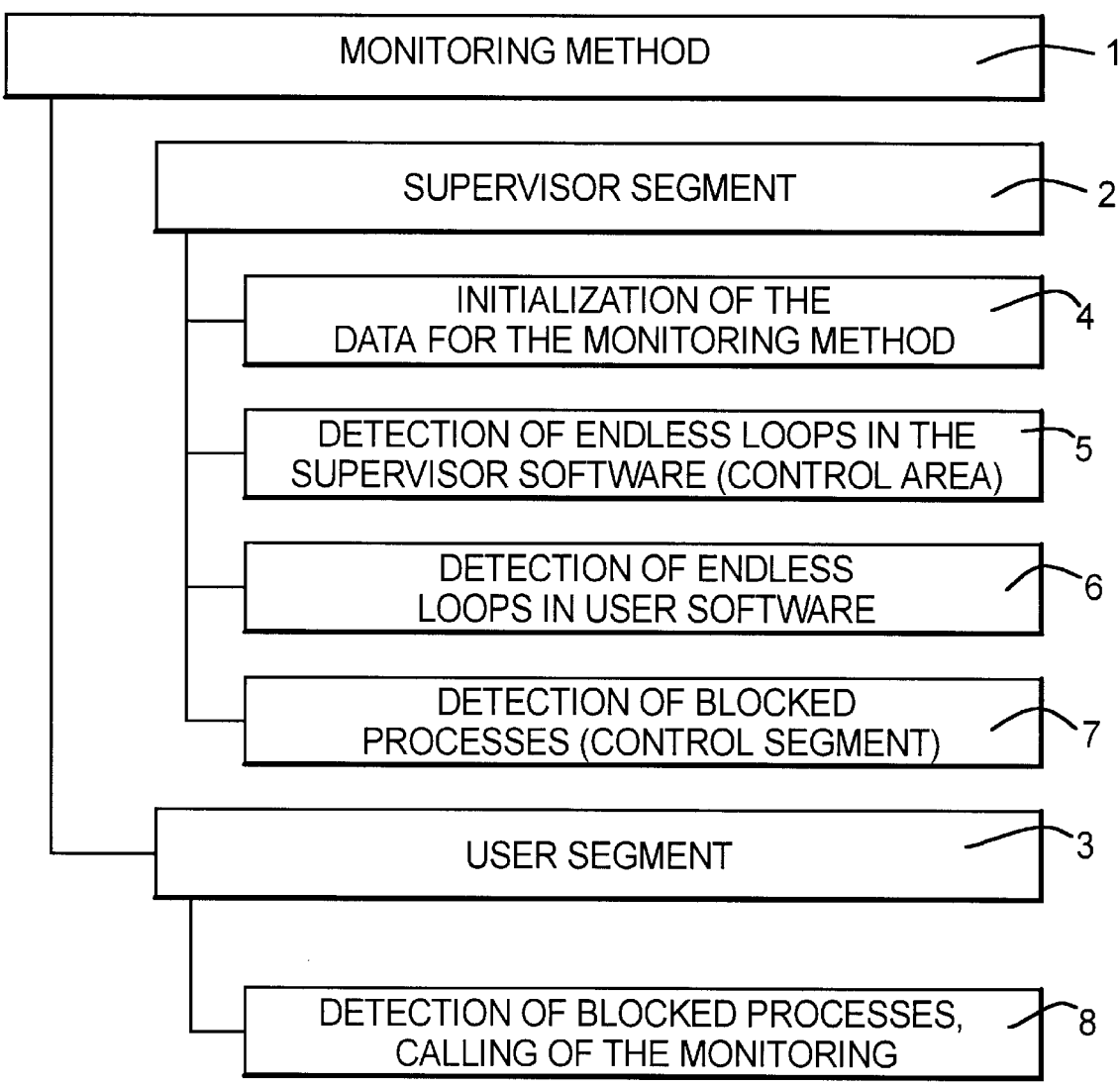
FIG. 1 shows the individual functional blocks of an exemplary embodiment of the inventive monitoring method.

The specified exemplary embodiment of the inventive monitoring method comprises the functional blocks (shown in FIG. 1) 2 (supervisor segment) and 3 (user segment), whereby the supervisor segment is designed for monitoring at higher interrupt levels greater than or equal to 1, and contains the sub-functional blocks 4 (initialization of the monitoring function data), 5 (monitoring of endless loops in the supervisor software and in the control segment), 6 (monitoring of endless loops in the user software) and 7 (detection of blocked processes in the control segment). The user segment 3 comprises the sub-functional block 8 (detection of blocked processes and activation of the monitoring).

Figure 2:
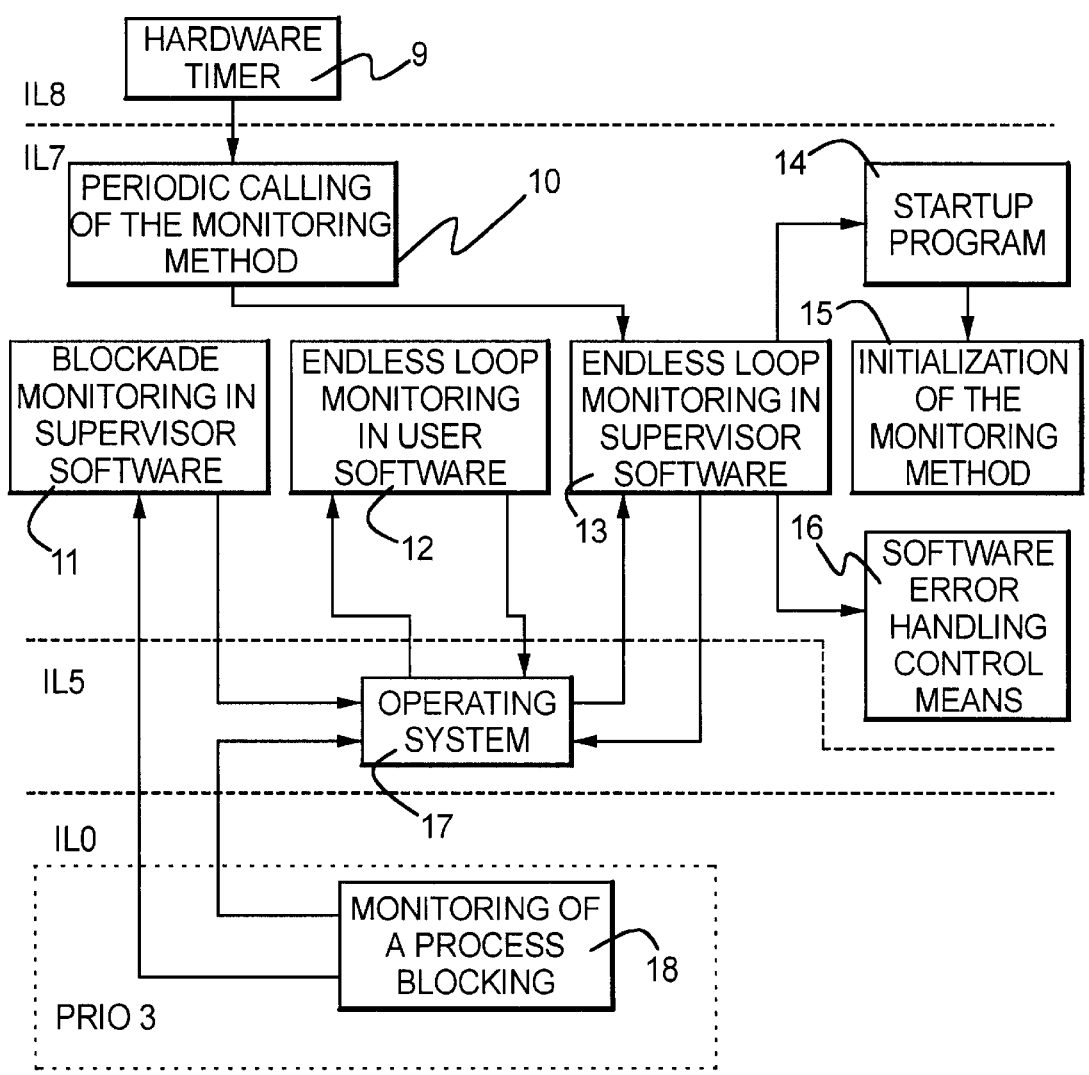
FIG. 2 illustrates the software structure of the exemplary embodiment according to FIG. 1.

The particulars of the software design are shown in greater detail in FIG. 2. A hardware timer 9 operates on the interrupt level 8 (IL 8) and effects a periodic activation of the monitoring function on interrupt level 7 (IL 7), which is illustrated in step 10. Endless loop detection in the supervisor software (block 13) is controlled by this means, as is indicated respectively by the arrows. In addition, the functional blocks 11, 12, 14, 15 and 16 are carried out on the interrupt level 7, whereby the block 11 symbolizes the detection of blocked processes in the supervisor software, the functional block 12 corresponds to the endless loop detection in the user software, and the blocks 14 and 15 correspond to an activation of the recovery software (block 14) and an initialization of the inventive monitoring function (block 15). In addition, a control unit 16 is provided for software error handling. The associated functions 17 of the operating system, which work together with the blocks 11, 12, 13 and 18 in a manner explained in more detail below, operate on the interrupt level 5. The functional block 18 effects the detection of blocked processes on the user level (interrupt level=0), whereby a signal from block 18 to block 11 is also provided.

In general, the inventive monitoring method is designed so that it not only detects endless loops and blocked processes, but also brings together suitable symptom data, which are passed to the software error handling routine and are stored on disk in order to enable offline analysis of the detected error. By means of the inventive monitoring function, corrective measures for the correction of the error can also be called.

In the following, the detection of endless loops in the user level is specified. The permissible runtime for the processing of a task is hereby specified by the user for each process to be monitored, and is stored in an information block of the respective process. The current runtime of each processor task is then calculated by a scheduler program of the operating software, which in addition periodically checks whether the process has exceeded the predetermined time limit in the execution of a task. If this is the case, the process concerned is brought to the attention of the inventive monitoring function. The scheduler program subsequently updates its counter, so that it can also detect when a monitored process exceeds its limit for the same task a second time.

The scheduler program also provides the inventive monitoring function with all items of information that are required for the verification of an error, i.e.: a process identifier (PID), the type of overrun of the runtime, the current counter with count state, including the task counter, the runtime of the task, etc., as well as specific items of information for the monitoring function. An access procedure for the writing of the specific values for the monitoring function is hereby also provided.

Figure 3:
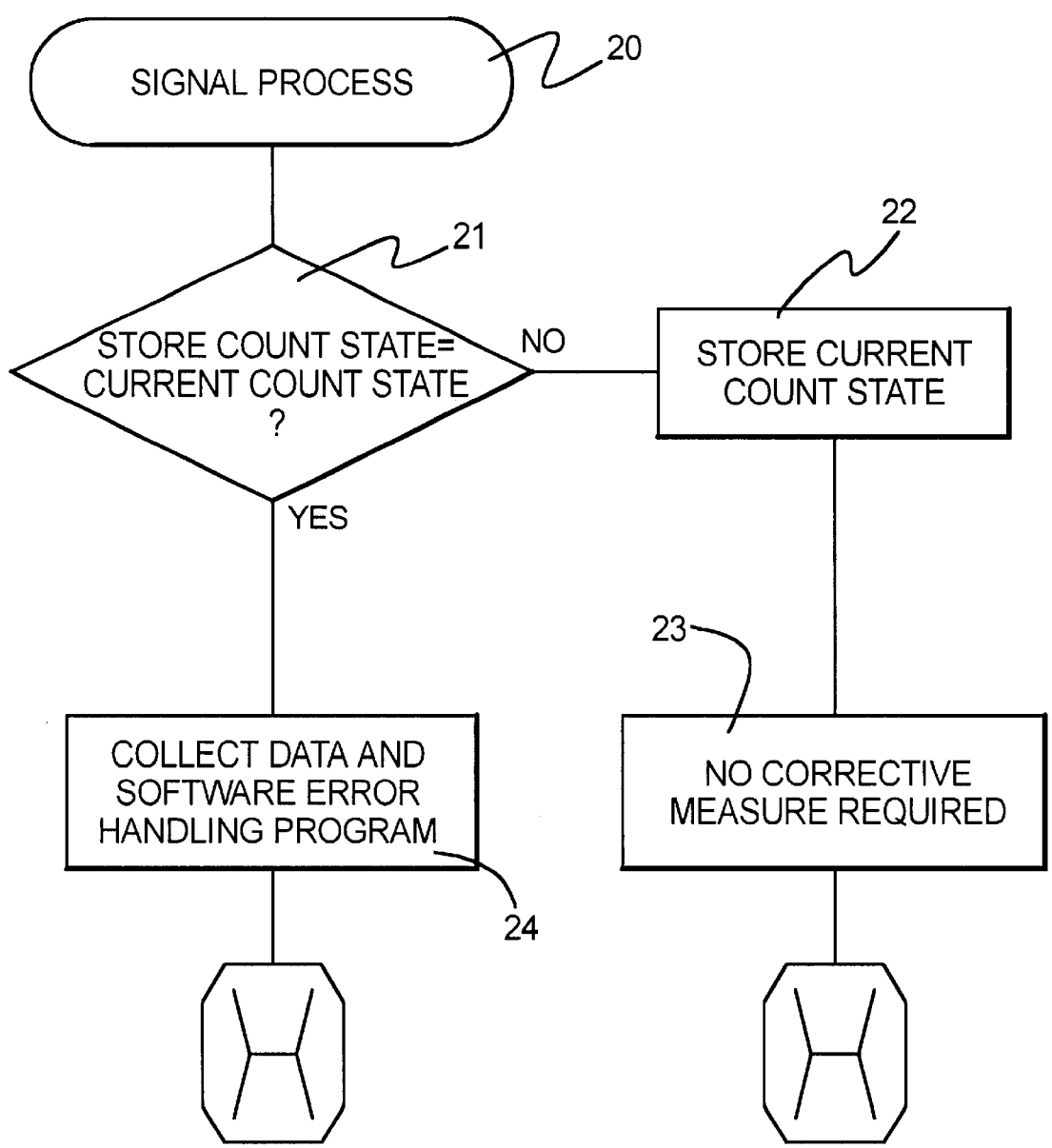
FIG. 3 shows a program execution plan given signaling of a possibly defective process.

Due to the operating system support described, the inventive monitoring function must check only whether a currently signaled process was already previously signaled by the scheduler program of the operating system. The respective items of information are thus provided in specific fields for the monitoring function, which fields are always arranged in the proper manner and sequence. The values of these fields are initialized by the scheduler program (e.g., are set to −1) when a process is started. When a process is signaled to the inventive monitoring function due to overrun of runtime, the counter values that are stored in the specific fields for the monitoring program are compared with the current count states. This is shown in FIG. 3 in the form of a flow diagram. After the signaling of a process (step 20), it is checked in a step 21 whether the stored values agree with the current values. Dependent on the type of the overrun of the runtime, the counter to be compared can be either the task counter or another counter, e.g. a region counter, insofar as the process has entered a region.

If the values are unequal (branch No in step 21), the current runtime values are stored either by the task counter or by the region counter in the specific fields of the monitoring function (step 22). In this case, no corrective measures are required (step 23), so that the monitoring function is again abandoned. However, if the check in step 21 has produced the result "yes," the signaled process has exceeded the runtime limit for the same task for the second time. In this case, in a step 24 the collection of additional items of information (data for error symptoms), and, finally, the introduction of corrective measures, take place.

Figure 4:
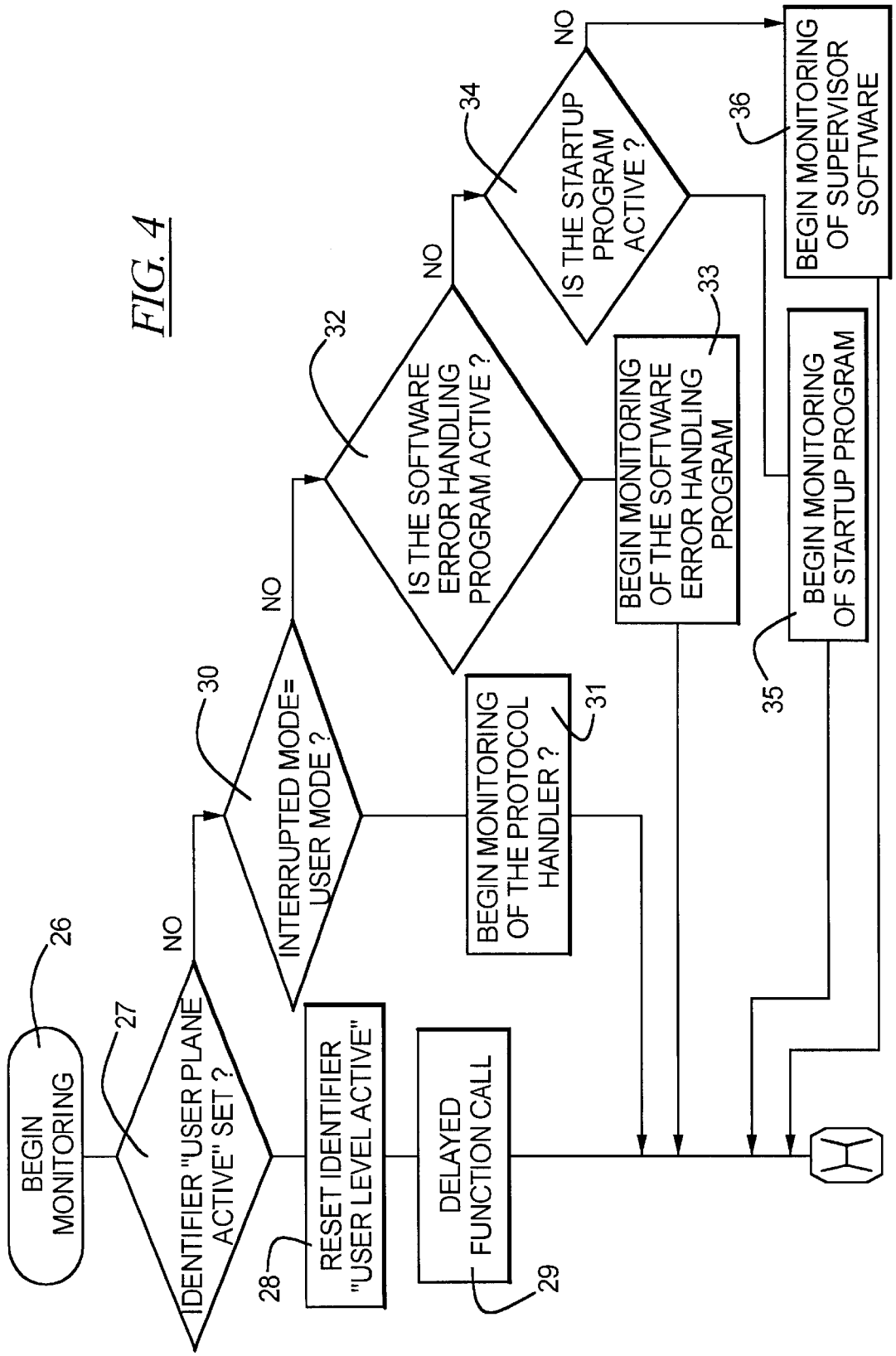
FIG. 4 shows a program execution plan for endless loop monitoring in different program segments.

For the detection of endless loops in the supervisor software running in interrupt levels 1 to 7, it is checked, as shown in FIG. 4, whether the program or the overall computing unit is in a startup phase (recovery process), or whether the protocol handler process PRH is running. The recovery software hereby consists of the two main parts: start phase and software error handling. These two segments mark their respective activation phases separately. The monitoring program thus checks the identifiers for the start phase or, respectively, the software error handling phase, in order to ensure that a detected time overrun actually corresponds to a real endless loop in the supervisor software, and not merely a start-up situation. These two recovery segments additionally contain activation counters, with which the monitoring program can determine whether there is an endless loop in the recovery software itself.

The protocol handler process runs in interrupt level 5 and is monitored separately.

With respect to the software error handling process, in the present exemplary embodiment the following time limits are defined. The presumption of an error is assumed when the supervisor segment of the software error handling process processes the same task for more than 10 milliseconds. An error is considered to be verified when the same task is carried out for more than 50 milliseconds.

With respect to the start software and the protocol handler, as well as the further parts of the supervisor software, an error presumption is assumed when the task or, respectively, the supervisor software is processed for longer than 500 milliseconds without the activation of a user software. The error is considered to be verified when this situation lasts for more than one second.

For the detection of endless loops in the supervisor software, the inventive monitoring function first requests a delayed function call for the interrupt level 1, so that an internal procedure of the monitoring program is called as soon as the interrupt level 0 (corresponding to the user level) has become active. In this process, an identifier "user level active" is set.

In the next calls of the monitoring function by the hardware timer (every 100 milliseconds), step 26 in FIG. 4, the identifier "user level active" is checked (step 27). If the identifier is set, it is reset (step 28), and a "delayed function call" request is requested (step 29), after which the monitoring function terminates the monitoring task. If the identifier "user level active" has not been reset, a transition takes place at step 27 to step 30, in which it is checked whether the interrupted mode is identical with the user mode. If this is the case, and the interrupted interrupt level is equal to 5, the monitoring of the protocol handler is started (step 31). If, however, in step 30 it turns out that the interrupted mode corresponds to a supervisor mode, further checking takes place to discover whether the error handling process is active (step 32) or whether a start-up is taking place (start-up active; step 34). If one of these processes is active, the monitoring of this process is introduced (step 33 or, respectively, 35). If, however, no recovery software is running ("no" at decisions 32 and 34), the monitoring of the remaining supervisor software is started (step 36).

In the case of a software error, a software error handling program is called that collects error indices, and, as needed, introduces a corrective measure. This segment of the software error handling program runs on the supervisor level. The software error handling program marks this activation phase by setting/resetting an activity identifier. In addition, the software error handling program contains an activity counter that is incremented at each activation of the software error handling program.

If in step 32 it is determined that the software error handling program is active, the count state of the activity counter of the software error handling program is stored, and the inventive monitoring function is called again, e.g. after 10 milliseconds. In this next call, the monitoring program compares the current state of the activity counter, provided by the software error handling program, with the stored value. If the two values are equal in magnitude, the software error handling continues to run in the same task, so that an endless loop is assumed. If the software error handling program works on the same task for more than a total of 50 milliseconds, an error, i.e. an endless loop, is finally inferred. The inventive monitoring program then introduces the collection of additional symptoms or, respectively, error indices, and finally controls the introduction of a corrective measure, i.e., a recovery. If in step 32 it turns out that the software error handling program is active, but it is determined in step 33 that the stored count state and the current count state of the activity counter are different, the current count state of the activity counter is stored, and upon the next call of the inventive monitoring program, given a still-active software error handling program, this state is compared with the then-current count state of the activity counter, so that the sequence explained above is repeated.

Insofar as the software error handling program runs in a higher interrupt level than the inventive monitoring program, it is preferably provided that the software error handling program is then monitored by a monitoring timer (watchdog).

In the same way as in the active software error handling program (step 32, 33), in the start-up program Start-Up (step 34) an identifier is thereby also set that indicates the activation phase thereof and is reset after the termination of the activity. The startup program also contains an activity counter that is incremented at each activity of the program. If in step 34 it turns out that the start-up program is active, in step 35 the count state of the activity counter is stored, and is compared with the then-current count state upon the next calling of the monitoring program. If the two values are equally large, the start-up program is still running in the same task. If this state lasts more than 500 milliseconds, the presence of an endless loop is presumed. This presumption is considered to be confirmed if the start-up program works in the same task for more than one second, after which the compilation of additional error indices (Symptom) is introduced, and finally the software error handling program is called for the introduction of a corrective measure. If, however, the count states differ, the then-current count state of the activity counter is stored, and the sequence described above is repeated.

If neither the start-up software (step 32, 34) nor the protocol handler (step 31) are active, and the user level is nonetheless not activated within 500 milliseconds, an endless loop is presumed in the supervisor software (step 36), and, if this state lasts longer than one second, the presumption is considered to be confirmed, after which, in the same way as in steps 33 and 35, the collection of error indices and the calling of the software error handling program is effected in order to introduce a corrective measure.

If it is determined that the protocol handler is active, a momentary recording of the state of the protocol handler is carried out (step 31), and the current count state of the task counter thereof is stored in the field specifically provided for the monitoring program in the process control block of the protocol handler. Upon the next call of the monitoring program, a new momentary recording of the state of the protocol handler is made, and the current count state of the task counter is compared with the stored value. If the two values are equally large for more than 500 milliseconds, an endless loop in the protocol handler is presumed. If the counters states remain equal for more than one second, the presence of an endless loop in the protocol handler is considered to be confirmed, and the collection of additional error indices is then introduced, and finally the software error handling program is called for the introduction of a corrective measure. If, on the other hand, the protocol handler is active, and the current and stored count states of the task counter differ, the current count state of the task counter is stored, and this value is compared with the then-current value in a further call of the monitoring program while the protocol handler is still active.

So that the inventive monitoring program can also monitor itself for endless loops and blocked states (see FIG. 5), a monitoring timer (watchdog) is used, which is normally reset by the interrupt handler in order to avoid expiration of the monitoring timer. The monitoring program informs the interrupt handler each time it begins a task in a high interrupt level. When the monitoring task is terminated, the monitoring program again informs the interrupt handler of this, so that this handler resets the monitoring timer, so that this element begins to run anew. However, if the monitoring program runs too long, i.e., the task is not terminated within the time interval predetermined by the monitoring timer, the monitoring timer expires, and thus signals, by means of its output signal, the time overrun error that has occurred in the monitoring program.

So that a monitoring of the start-up supervisor for endless loops can also be provided given recoveries on a higher level, with the aid of the monitoring timer (watchdog), a first triggering of the monitoring timer takes place when the function of the endless loop monitoring in interrupt levels above the user level is provided by means of the inventive monitoring program. The monitoring timer is hereby loaded at first with a value that is sufficient for the time period between the start of the monitoring timer and the first triggering thereof, commanded by the monitoring program. If the user level is reached according to plan, the monitoring timer is then loaded by the interrupt handler with a value that is sufficient for the user plane. The monitoring function of the monitoring program is then activated 10 milliseconds after user mode is achieved.

Figure 5:
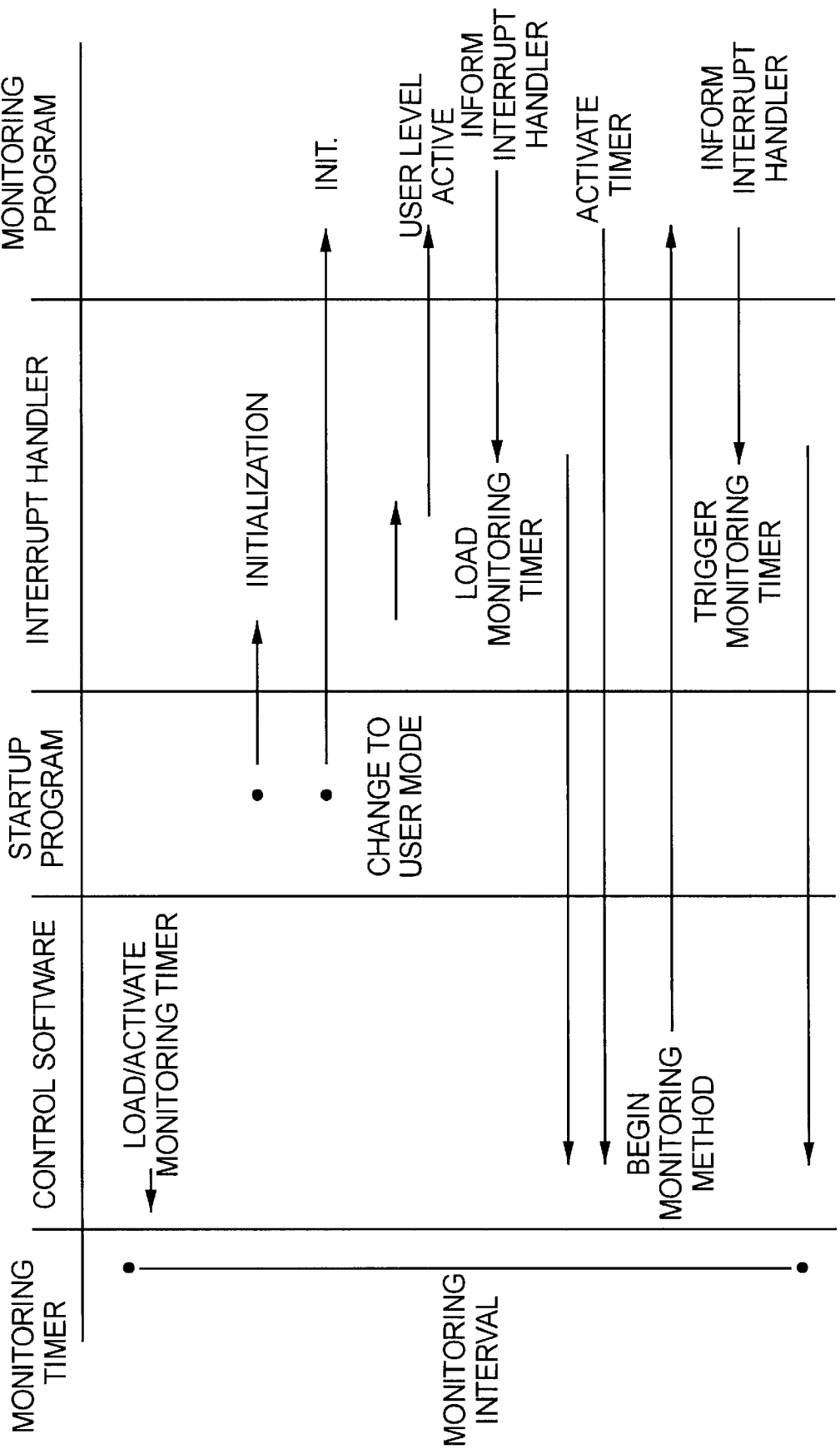
FIG. 5 shows a program execution plan for endless loop monitoring on the supervisor level.

This fact is shown in FIG. 5 in the form of a time and level diagram, whereby the time axis is plotted in the downward direction.

If a higher-order program, such as for example an interactive error removal program, is running, it can happen that the specific hardware timer provided for the monitoring program runs out, although the system is stopped. In order to prevent an inappropriate startup of the computing unit in such a case, such higher-order programs inform the inventive monitoring function about their activity, whereupon the monitoring program stops its hardware timer for the duration of the activity of this higher-order program.

In general, when the inventive monitoring program recognizes an endless loop, it introduces a single-step tracing for a suitable time period, which for example is at least 10 milliseconds, in order to collect in this way additional error symptoms.

Figure 6:
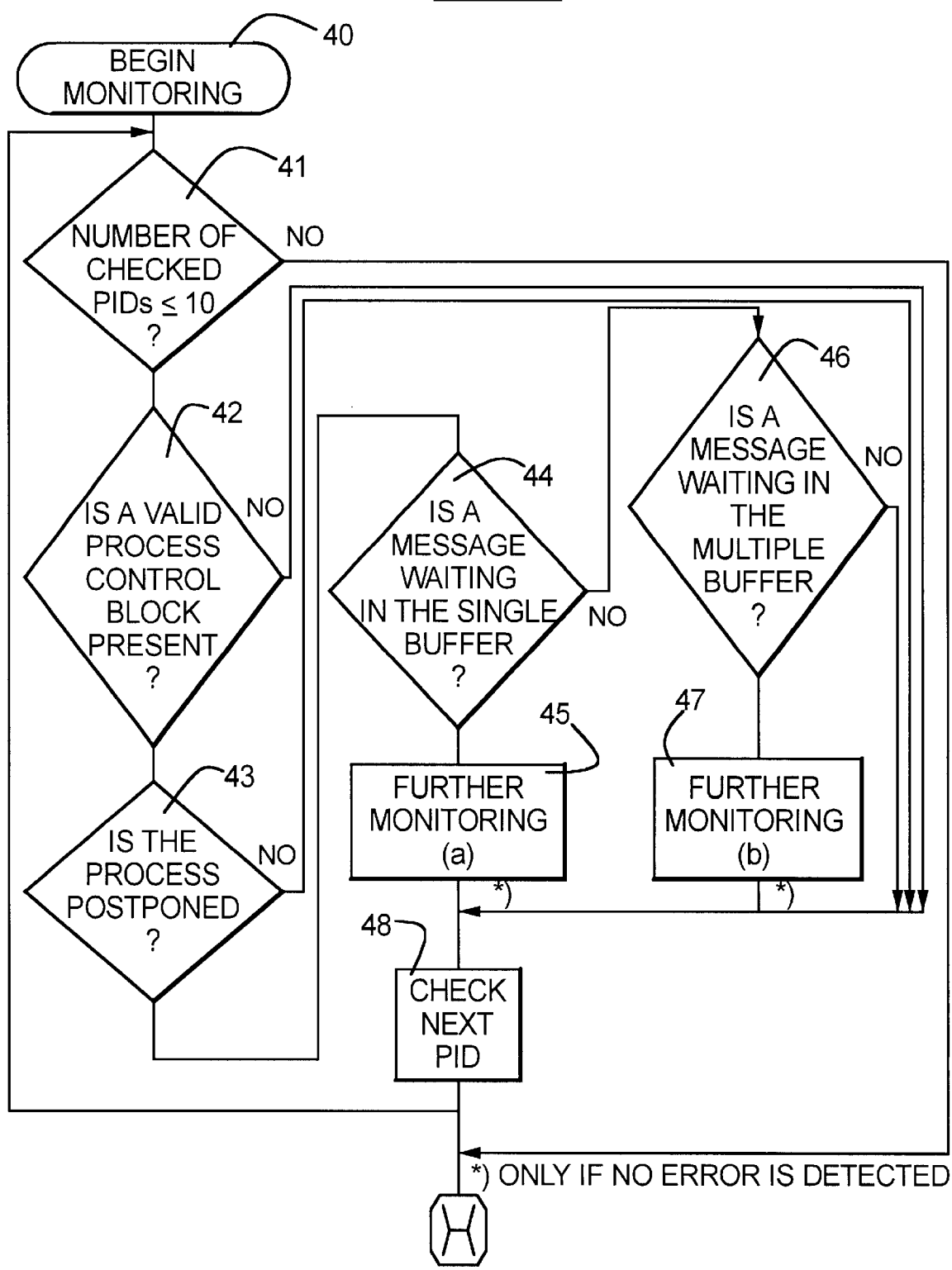
FIG. 6 shows an execution diagram for the detection of blocked processes.

In the following, the detection of blocked processes is explained in more detail with reference to FIG. 6. The definition of "blocked" hereby depends on the type of buffer memory allocated to the process. Two types of buffer memories are present, namely buffer memories with reserved access only through this one program, and buffer memories with multiple access through several programs. Depending on the type of buffer memory, the blockade monitoring is thus reversed. In the process control block of each process, a time limit indication is thus present that serves for the blockade recognition and is detected and evaluated via the monitoring program. In addition, the scheduler of the operating system provides the inventive monitoring method with all data required for the recognition and verification of a blocked state, in particular a pointer for the process type table, a blockade limit, the process status, the halter identification, the task counter, and/or a blockade information group containing an identifier that shows whether a message in a buffer waits for individual access only or for multiple access by several programs. These items of information are stored in the process control block of each process.

In the initialization of the monitoring method, all process identification data PID are determined and are stored in an internal table. This table is then queried periodically by a process with a lower priority (e.g., with priority 3; see FIG. 2) (step 40). In a step 41, it is queried whether the number of PIDs checked in this task is less than or equal to 10. If the answer is "no," the task is abandoned. Otherwise, in a step 42 it is checked whether a valid process control block PCB for the selected process identification PID is present, and a momentary recording of each valid PCB is made. Subsequently, in a step 43 it is checked whether the process has been postponed. In addition, the blockade limit provided in the process control block can also be checked, and if this limit exceeds a predetermined boundary value the blockade checking of this process can be terminated. If in step 43 it has been determined that the process is postponed, in a step 44 it is checked whether a message is waiting in the buffer, and whether this is a buffer that can be accessed only by the current process. If these conditions hold, in a step 45 a correspondingly adapted monitoring is carried out, whereas if the buffer is one that is accessed by several processes, in a step 46 it is checked whether a message is present, and if so a correspondingly adapted monitoring (step 47) is carried out. If steps 45 or, respectively, 47 do not lead to a blockade error message, or if in steps 42, 43 and 46 the answer "no" respectively results, in a step 48 a transition takes place to the checking of the next PID, and the sequence is repeated, beginning with step 41.

If in step 45 or 47 a blockade state is determined, a corresponding corrective measure is introduced. If a process is present that is supposed to be monitored by the inventive monitoring method, the following items of information are stored in the fields of the process control block reserved for the monitoring method: an identifier that indicates whether the message is waiting in a buffer for individual access by a single program or in a buffer for access by several programs; a time indication, a task counter or, respectively, count state, and a buffer address. The time indication is required for the later decision whether the time limit for the emission of a communication concerning a blocked process has been exceeded. If a message is waiting in a buffer to which several processes have access, it is first checked whether all called versions of this process are in the "postponed" state. Only if this is the case is a further checking for a blockade carried out; otherwise the blockade check is broken off for this case. In the process control block PCB, in this case the same indications are respectively stored as in the case of a buffer reserved only for one process.

If the blockade check is subsequently carried out repeatedly, it is checked whether a process already determined as blocked continues to be in the blocked state. If the process is further postponed, the count state of the task counter has not changed, and the time limit is exceeded, the process is ranked as "probably blocked." If in contrast the task counter has changed, the monitoring is begun again, even if the process is again postponed. In the case of processes that operate with a buffer for access by several processes, it is not sufficient merely to recheck the process status and the count state of the task counter of all called versions, since the message found in the first check may have been processed in the meantime by a called version that has already terminated. It is thus first checked whether in addition the same message is waiting in the same buffer.

If the provided time limit is exceeded twice, the corresponding process or process type is ranked as "blocked," and a corresponding corrective measure is initiated.

In the following, the error indices (symptoms) collected in the specified exemplary embodiment of the inventive monitoring method are described. If an endless loop is presumed in a supervisor software, the following data are collected: interrupt level, in which the endless loop runs, register contents, expanded instruction pointer (EIP) and expanded identifiers (status register). The collected symptoms are handed to the software error handling program and saved on a hard drive, if an error has been verified. If the error cannot be verified, i.e., the presumption turns out to be mistaken, the collected symptoms are deleted. In the verification of an endless loop in the supervisor software, a single-step tracing and registration is activated for at least 10 seconds, whereby the data indicated above are collected, which are stored only in another table.

If an endless loop is detected in the user software (interrupt level=0), the last-received message (e.g., 50 bytes) is saved, and a rapid process step tracing program is activated.

If blocked processes are determined, the last-received message is saved by the monitoring method.

In addition, the following items of information can also be collected: time of day; process identification and code address of the activated process and/or provided time limit. The data that arise in the tracing of the program are stored in a separate memory region until a sufficient number of data are present, which are then made available for the software error handling.

Given the determination of an error, the following are preferably provided: given an endless loop in a user process, a resetting of the process, including deletion of the associated buffer memory; given an endless loop in an interrupt level greater than 0, a complete resetting of the computing unit. A complete resetting is also provided if it is not possible to restart the hardware timer, or to reach a desired interrupt plane.

For the realization of the functions named above, several operating system interfaces tailored specifically to the inventive monitoring method are preferably provided, so that the monitoring tasks can be carried out effectively and without a large management expense.

Figure 7:
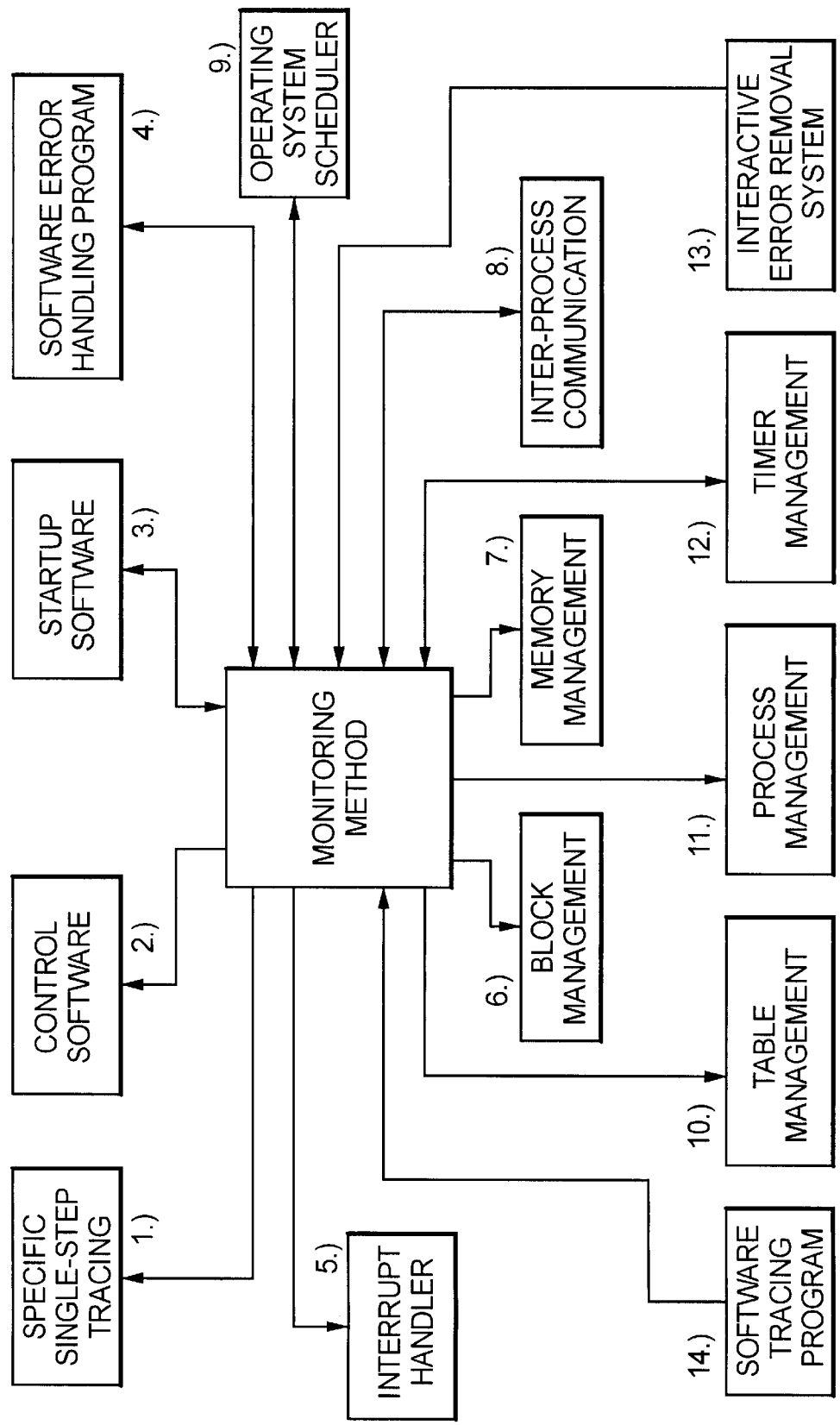
FIG. 7 shows interfaces between the inventive monitoring method and individual program segments of the monitored software.

In FIG. 7, these interfaces between the exemplary embodiment of the inventive monitoring method 50 and the individual program segments of the computing unit of the switching system are shown schematically in the form of a block switching diagram. Since FIG. 7 is self-explanatory, no more detailed description is required.

In the inventive method, all processes in the system are thus monitored for endless loops, and in case of error are unambiguously identified if warranted, so that both slowly-running processes, i.e., processes with lower priority, and rapid and important processes, i.e., frequently running processes with high priority, are monitored. In addition, it is also hereby investigated whether the processes also read out received messages. The inventive monitoring method thereby need not store any data concerning signaled processes and their runtime boundary values, since these items of information are all stored in the respective process control block of the relevant process. The risk of data falsification is hereby also minimized.

In the inventive method, the interrupt handler is preferably used as a signaling point for the reaching of the process level (interrupt level=0), which is dynamically more advantageous than, for example, the use of a test process. The realization of the monitoring function, in particular for a real-time system, is thereby dynamically optimized with respect to the runtime behavior.

Since the modules that contain the buffer information are preferably visible in the supervisor capsule, no changes of capsule are required for access to the data required for the checking, so that no dynamic loss results here. In addition, the system is preferably designed in such a way that only 10 processes are tested per task, and the inventive monitoring method then terminates automatically, so that the system is not dynamically loaded by the inventive monitoring method.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A monitoring method for recognizing software errors, the software errors being at least one of endless loops and blocked processes to be monitored in a computing system, comprising the steps of:

comparing, with a process other than one of the processes to be monitored, a runtime of a selected process, which is one of the processes to be monitored, with a runtime boundary value provided for the selected process;

producing an error message given an overrun and storing a current task count state of executed tasks of the selected process;

comparing said state with a then-current task count state of the selected process in a next checking of the selected process, an endless loop being inferred if no task count state incrementing is determined.

2. The monitoring method according to claim 1, wherein items of information concerning a runtime overrun, and concerning the task count state are stored in a process control block of the process, and, given a rechecking of said block, said items of information are queried.

3. The monitoring method according to claim 1, wherein the method is called periodically by a timer.

4. The monitoring method according to claim 1, wherein the method is called more than once and wherein a monitoring timer is triggered upon each call of the monitoring method, a watchdog being reset upon termination of the monitoring method and, if the resetting is missing, an error signal is produced after the expiration of an internally set time interval.

5. The monitoring method according to claim 1, wherein, when an endless loop is detected, a single-step monitoring and registration of the program running in the endless loop is carried out for a particular time interval.

6. The monitoring method according to claim 1, wherein at least one of an error removal program and a startup program with an activity counter is provided that is incremented at each new activity task of the associated program, and wherein during periodic calling of the monitoring program, the monitoring program checks and stores the respective count state of the activity counter, and, given expiration of a determined time interval without termination of the error removal program or, respectively, of the startup program, and without a change in the count state of the activity counter, an endless loop is inferred by the monitoring program.

7. The monitoring method according to claim 1, wherein the method is checked to determine if one of a startup program or a protocol handler program is active, and, if this is not active, and a program waiting at a lower interrupt level has nonetheless not begun, an endless loop in a higher interrupt level is inferred.

8. The monitoring method according to claim 1, wherein, in order to recognize blocked processes, the method is checked to determine if the process is in a "postponed" state, and if a message is waiting in a buffer allocated to the process that is not read out within a determined time period.

9. The monitoring method according to claim 8, wherein the method is also checked to determine if the process executes no task within a given time limit.

10. The monitoring method according to claim 8, wherein if several processes have access to the buffer, the method is checked to determine if all of these processes are postponed and do not process a message present in the buffer within a determined time period.

11. The monitoring method according to claim 3, wherein the timer is a hardware timer with a high interrupt priority.

12. A monitoring method for recognizing software errors, the software errors being at least one of endless loops and blocked processes in a computing system, comprising the steps of:

comparing runtime of a selected process with a runtime boundary value provided for the selected process;

producing an error message given an overrun and storing a current task count state of executed tasks of the selected process;

comparing said state with a then-current task count state of the selected process in a next checking of the selected process, an endless loop being inferred if no task count state incrementing is determined;

detecting an endless loop; and executing a single-step monitoring and registration of the program running in the endless loop for a particular time interval.

13. The monitoring method according to claim 12, wherein items of information concerning a runtime overrun, and concerning the task count state are stored in a process control block of the process, and, given a rechecking of said block, said items of information are queried.

14. The monitoring method according to claim 12, wherein the method is called periodically by a timer.

15. The monitoring method according to claim 12, wherein the method is called more than once and wherein a monitoring timer is triggered upon each call of the monitoring method, a watchdog being reset upon termination of the monitoring method and, if the resetting is missing, an error signal is produced after the expiration of an internally set time interval.

16. A monitoring method for recognizing software errors, the software errors being at least one of endless loops and blocked processes in a computing system, comprising the steps of:

comparing runtime of a selected process with a runtime boundary value provided for the selected process;

producing an error message given an overrun and storing a current task count state of executed tasks of the selected process;

providing at least one of an error removal program and a startup program with an activity counter that is incremented at each new activity task of the associated program;

checking and storing, during periodic calling of the monitoring program, a respective count state of the activity counter; and inferring, given expiration of a determined time interval without termination of the error removal program or, respectively, of the startup program, and without a change in the count state of the activity counter, an endless loop.

17. The monitoring method according to claim 16, wherein the method is checked to determine if one of a startup program or a protocol handler program is active, and, if this is not active, and a program waiting at a lower interrupt level has nonetheless not begun, an endless loop in a higher interrupt level is inferred.

18. The monitoring method according to claim 16, wherein, in order to recognize blocked processes, the method is checked to determine if the process is in a "postponed" state, and if a message is waiting in a buffer allocated to the process that is not read out within a determined time period.

19. The monitoring method according to claim 18, wherein the method is also checked to determine if the process executes no task within a given time limit.

20. The monitoring method according to claim 18, wherein if several processes have access to the buffer, the method is checked to determine if all of these processes are postponed and do not process a message present in the buffer within a determined time period.

* * * * *